United States Patent Office 3,600,266
Patented Aug. 17, 1971

3,600,266
COLOR STABILIZED POLYVINYL CHLORIDE POLYURETHANE COMPOSITIONS
Elwood E. Huntzinger, Springfield, Pa., assignor to Air Products and Chemicals, Inc., Philadelphia, Pa.
No Drawing. Filed June 26, 1968, Ser. No. 740,029
Int. Cl. B32b 5/18
U.S. Cl. 161—160                                               6 Claims

ABSTRACT OF THE DISCLOSURE

Plastic products wherein a tertiary amine catalyzed semi-rigid polyurethane foam juxtaposes a layer of non-porous polyvinyl chloride are safeguarded against staining of the polyvinyl chloride layer by the incorporation in the polyurethane of a slightly volatile halogen-containing compound which may be added in an appropriate adjuvant. Additionally, methods of making such foams and precursor compositions for the foams are disclosed.

BACKGROUND OF THE INVENTION

(1) Field of the invention

The invention pertains to polyurethane foams. More particularly, the invention relates to polyurethane foams containing special additives which keep the foams from staining or discoloring polyvinyl chloride materials with which they may be in contact.

(2) Prior art

Over the past decade or so, various polymeric variations of the polyurethane family have grown to be items of considerable commercial value. Within this burgeoning field, the foam-forms of polyurethanes have been particularly significant. The rigid foams have found their place as insulation, building adjuncts and in other uses. Flexible foams have been widely employed in mattresses, cushions and the like where resiliency and long life are factors. The semi-rigid polyurethane foams had been of wide usage where their particular properties have proven highly advantageous.

One such advantageous use area has developed in the field of protective padding of rigid objects otherwise potentially injurious upon impact to person or inanimate objects. The suppliers of transportation facilities have recognized this advantage and have been increasing their use of semi-rigid foams for such padding purposes.

In conjunction with the use development of the semi-rigid foams, there has been the need to provide a suitable covering for the foam. Such covering material has to meet certain requirements including resistance to wear, as well as possession of strength, flexibility and decorative appearance. Polyvinyl chloride resins possess these and other desirable properties which when employed as an outer covering or "skin," forms, with the semi-rigid polyurethane foam, an extremely practical protective combination.

One major contribution to polyurethane technology has been that of the provision of particularly effective catalyst systems enabling the rapid controllable conversion of the precursor components into quality polymeric products. Many catalyst systems have been proposed. Of these, the ones having by far the widest commercial acceptance are those consisting of or comprising a tertiary amine.

However, with the tertiary amine-catalyzed foams in planar juxtaposition to polyvinyl chloride skins, a problem of an aesthetic nature has created certain commercial and consumer acceptance difficulties. The particular problem resides in the discoloration or staining of light color polyvinyl chloride skins. While such discoloration has no material effect on the physical properties relating to practical utility, consumer objection is quite strong to a fairly rapid and very evident change from an originally-selected color. Since suppliers are sensitive to the opinion of customers various attempts have been made to alleviate this problem of discoloration. No significant quantity of literature has developed so far on such activities although it is known within the art that such studies have been and are being made.

Until the advent of this invention success has been elusive. Such formulations as have evidenced elements of success have had other shortcomings, such as poor physical properties of one sort or another, or the cost factor has been prohibitive, or formulation problems have been too great for any apparent ready solution.

SUMMARY OF THE INVENTION

It has now been discovered that without disrupting normal procedures while remaining well within economic practicality, the customary desirable formulation, processing and product quality of the semi-rigid polyurethane foams can be made with substantially inhibited tendencies to create staining problems when used with polyvinyl skins. This highly desirable result is obtained by including in the formulation for the preparation of tertiary amine-catalyzed polyurethane semi-rigid foams an effective amount of a stain-inhibiting composition of one or more of the halides selected from the group consisting of alkyl bromide, aralkyl halide, alkyl dibromide, aralkyl dibromide, alkyl chlorobromides, organic chlorides and bromides characterized by an allylic double bond structure, epihalohydrins, and haloalkyl phosphate esters. Such halogen-containing composition may be carried in an adjuvant terpolymer stabilizer preferably of the type disclosed in Erner, U.S. 3,270,032.

The halogen-component portion of the stain-inhibitory additive is employed in an amount in the range of 0.1–4.0 percent by weight of the total weight of the polyurethane formulation. The terpolymer adjuvant for the halogen-component is present in an amount in the range of 0.2 to 1.5 parts by weight per part of the halogen-component.

It is believed that the effective results obtained through the use of the additive of the present invention in part result from a complexing reaction of the halogen-composition with the amine, whether present as an excess or released from the completed polyurethane semi-rigid foam. The correctness of the theory is immaterial insofar as practice of the invention is concerned and is merely volunteered.

However, it is certain that for the success of the present invention it is important that the additive generally should be kept separate from the tertiary amine catalyst until the combinaion of the various ingredients being brought together for the immediate preparation of the polyurethane foam. Otherwise prolonged contact between the tertiary amine catalyst and the halogen-composition may render the catalyst partially or completely ineffective for the promotion of urethane reaction.

Accordingly, it is an object of the invention to provide polyurethane foams which, when in planar juxtaposition with polyvinyl chloride skins will not stain or discolor said skins.

It is an additional object of the invention to provide a method of imparting non-polyvinyl chloride-staining characteristics to a polyurethane foam catalyzed by a tertiary amine by incorporating in the foam precursor formulation an organic halide.

It is a further object of the invention to provide polyurethane foam precursor formulations, from which foams may be derived, which do not stain or discolor polyvinyl chloride film, sheet or skin when in layered juxtaposition therewith.

These and other objects of the invention will be apparent to those skilled in the art from a consideration of the description of the invention which follows.

GENERAL AND SPECIFIC DESCRIPTION OF THE INVENTION

The compositions and formulations for the semi-rigid polyurethane foams form no particular part of the present invention other than as a framework of reference with respect to which the instant invention constitutes an improvement. Polyether and/or polyester polyols, tolylene diisocyanate and other isocyanato-contributing compositions, blowing agents including water, fluorocarbons or others are all well known to the art. Catalyst compositions of an organo-tin compound employed in conjunction with various tertiary amines are particularly effective but not exclusively so. Of the tertiary amines, the triethylenediamine of 1,4-diazabicyclo (2.2.2) octane and N,N,N',N'-tetramethyl-1,3-butanediamine are highly active. These and other tertiary amines and their use in the catalysis of polyurethane compositions have been described, variously, in U.S. Pat. Nos. 2,937,176; 2,939,851; 3,167,518; 3,313,744; and 3,352,803.

As used herein the term halogen-containing compounds or "organic halides" encompasses materials such as, for example, the allyl, amyl, n-octyl, lauryl and cyclohexyl bromides; 1,3-dibromopropane and 1,5-dibromopentane; ethylene dibromide; 1-bromo-3-chloropropane; bromoform; $\alpha$-bromo-1,2-dimethylbenzene; epichlorohydrin an epibromohydrin; propylene bromohydrin; dodecenyl chloride; brominated polyols; and various haloalkyl phosphate esters such as, for example, tris-beta-chloroethyl phosphate and tris-2,3-dibromopropyl phosphate. A preferred organic halide is trimethylene chlorobromide (or the above-identified 1-bromo-3-chloropropane). This material is preferred because of its relatively low cost as well as its efficiency in the achievement of the desired effect through the instant invention. When the terms halogen and halide are employed herein it is to be understood that such reference is to either bromine or chlorine as the case may be. The fluorocarbons and iodocarbons have possibly some favorable aspects but generally reflect an order of reactivity unsuited to commercial embodiments of the instant invention. Additionally they possess certain toxic, odor and/or other characteristics which mitigate against their practical adaptation in the herein-described use area.

The adjuvant of the type particularly effective in the present invention is of the nature of the polymeric stabilizers useful in some polyurethane formulations. As mentioned, a preferred embodiment is that type described in Erner, U.S. 3,270,032. Particularly preferred are those prepared by exhaustive catalytic co-polymerization of a precursor composition comprising a plurality of monomers having polymerizable ethylene groups, from 17 to 67 mol percent of the polymers being vinyl pyrrolidone, from 17 to 67 mol percent of the monomers being dibutyl maleate, and from 16 to 67 mol percent of the monomers being vinyl acetate, these monomers being present along with either a nonyl phenyl-polyoxyethylene ethanol and/or dodecyl mercaptan.

In the present invention such terpolymer adjuvant does not, per se, serve as a foam stabilizer in the accepted sense of the word nor is it employed in the quantity associated with its use as a foam stabilizer. Such terpolymer serves in the present invention in several capacities including improving the dispersal qualities of the halogen-containing component throughout either the polyol and/or isocyanate components as well as an inhibitent to the early attack of the halogen-containing component on the tertiary amine, i.e. during the up to three minutes or so of the critical period of the polyurethane formation, crosslinking and foaming. The terpolymer adjuvant should be fully compatible with the polyurethane, both initially and throughout the normal useful life of the polyurethane product. Thus, as used herein, the term adjuvant terpolymer means a multifunctional terpolymer of the type disclosed in the aforementioned Erner patent which is fully compatible with the particular polyurethane formulation being utilized.

It is to be understood that the various organic halides having utility within the scope of this invention are not, of necessity, of equal effectiveness and some may be just adequate while others range from better to superior. Likewise, as is readily understood, some deviation of results may be noted even with the same additive in differing formulations of the polyurethanes, such as, for example, between systems employing aminopolyols and those prepared from non-aminopolyols. Likewise, some differences may be expected in polyurethane foams other than the semi-rigid type. However, such deviations are matters of degree and not of kind.

A better comprehension of the invention can be obtained through reference to the following non-limiting examples. These examples while indicative of the operation and advantages of the invention, do not imply limitations other than those generally suggested by the disclosure and claims.

The following examples include a method of rating the effective quality of additives in all the reported tests. There are several test procedures available and usually directed to a measurement in connection with some particular need or use situation, as for example, in an engineering specification of a major automobile manufacturer's requirements on handles for doors where the test samples should show a change of no greater than a three (3) rating of the AATCC (i.e. American Association of Textile Colorists and Chemists) chart after aging at about 215° F. for 7 days. However, to provide a broader base on which to evaluate test samples a reflectance test method was adopted with an arbitrarily selected lower limit sufficiently high enough to generally meet or surpass the acceptance requirements of other tests.

Thus thet est procedure employed in the following example was as follows:

(1) Prepare urethane foam-vinyl skin composite by foaming directly on vinyl specimen (2" x 2" x .035"–.070").

(2) Cut a 2" x 2" x 2" block of the prepared foam one side of which contains the vinyl specimen.

(3) Place composite sample in a quart jar and close the jar with cap.

(4) Place in mechanical convection oven for either
   (A) 7 days at 215±5° F. or
   (B) 16 hrs. at 255–260° F.

(5) Measure the reflectance of the vinyl specimen with a Photovolt reflectance meter equipped with a blue tristimulus filter.

The 100% reflectance value was normalized to equal the whiteness of an unexposed, $TiO_2$ filled vinyl specimen. The reflectance of both sides of the specimen was measured as a direct percent of the reflectance of the blank. Contact stain (the reflectance of that side of the specimen in direct contact with foam scraped from specimen before testing) and vapor stain (the reflectance of that side of the specimen not in contact with foam) were the indicative values. The arbitrary minimum was set at 35% reflectance for the "Vapor" stain value although a reflectance value adequate for known commercial standards is subject to interpretation depending frequently on such matters as the quality and surface of the polyvinyl chloride film as well as in the degree of off-white or shade or hue of the individual films.

Various commercially available products were used in these tests for the preparation of the polyvinyl chloride layer (as used herein "layer" means a film, sheet or skin which is in planar juxtaposition with a foam body, whether bonded thereto or not) and for the preparation of the foamed polyurethane layer. Those skilled in the art will be familiar with the products used. Those unfamiliar with the art may utilize the following glossary:

Dabco—A brand of triethylenediamine used as a catalyst in the formation of foamed polyurethanes.

Dabco 33–LV—A low viscosity solution of triethylenediamine in dipropylene glycol used as a catalyst in the formation of foamed polyurethanes.

DIOP—Diisooctyl phthalate.

F706R—A blend of a polyether triol and a polyether tetrol, the latter being amine initiated. When mixed with catalyst, (e.g. Dabco), used as the B part of a two shot system.

F706T—A quasi-prepolymer containing 10.4% TDI. The polyol is a polyether triol. Used as the A part of a two shot system in conjunction with a B part comprising F706R and catalyst.

Ferro 1720—A liquid inhibitor of the Ba-Cd-Zn type.

Geon 121—A high molecular weight polyvinyl chloride homopolymer, dispersion grade, specific viscosity 0.57 to 0.63.

Paraplex G–62—Epoxidized soybean oil.

TDI—Tolylene diisocyanate.

Voranol CP4601—A glycerine initiated triol of about 4,600 mols weight which contains a significant quantity of primary OH, has from 1.045 to 1.215 wt. percent hydroxyl, and OH number of 34.5 to 40.1 and a maximum acid number of 0.05 mg. KOH/gram.

Voranol RS350—Sucrose based polyether type crosslinking agent referred to in Pat. No. 3,256,215 (col. 5, line 25) as Polyol S–2. This is a condensation product of sucrose and propylene oxide containing about 10.6 weight percent OH, having an OH number of 340–363 and other characteristics listed on page 5 of "Vorane Urethane Polyols" copyrighted 1966 by Dow Chemical Co.

EXAMPLE I

A polyvinyl chloride formulation was prepared with:
100 parts by weight—Geon 121
50 parts by weight—DIOP
25 parts by weight—P—araplex G–62
3 parts by weight—Ferro 1720
6 parts by weight—TiO$_2$ The polyvinyl chloride was formed and cured at standard conditions as a sheet.

EXAMPLE II

A representative aminopolyol polyurethane "Two shot" formulation for producing semi-rigid polyurethane foam was prepared as follows:

A part 100 parts by weight—F706T

B part 18.4 parts by weight—F706R
0.3 part by weight—Catalyst (Dabco)

The polyurethane formulation was mixed and placed in contact with a portion of the vinyl sheet, foamed and tested by the described method. The test results are listed in Table 1 below as "Standard," and that is a formulation not containing an additive of the inventions.

In similar manner other test samples were prepared using various additives of the invention which are indicated in Table 1 along with the test results obtained.

TABLE 1

| Additive used | P.h.p.[1] | Percent by weight of total formulation | 16 hrs. at 225° F. Contact | 16 hrs. at 225° F. Vapor | 7 days at 215° F. Contact | 7 days at 215° F. Vapor |
|---|---|---|---|---|---|---|
| None, standard | None | 0.0 | 6 | 12 | 7 | 5 |
| Trimethylene chlorobromide (TMCB) | 0.5 | 0.42 | | | 35 | 42 |
|  | 1.0 | 0.84 | | | 36 | 54 |
| n-Octyl bromide | 1.0 | 0.84 | | | 32 | 44 |
| Lauryl bromide | 1.0 | 0.84 | | | 33 | 41 |

[1] Parts by weight per hundred parts of prepolymer.

As shown above, the presence of the additive substantially improves the reflectance values of the vinyl skin.

EXAMPLE III

A polyurethane formulation of the non-aminopolyol type was prepared with:

A part 100 parts by weight—Mixture of Voranol CP4601 and Voranol RS350 (80:20)—prepolymer with 12.5% NCO B part 75 parts by weight—Mixture of Voranol CP4601 and Voranol RS350 (80:20)
1.3 part by weight—Water
1.1 part by weight—Dabco 33–LV The vinyl skin necessary was taken from the sheet material prepared in connection with Example I above. The polyurethane formulation was placed in contact with a sample of the vinyl sheet, foamed and tested as described above. The sample with no additive is reported in Table 2 as "Standard." The results of other tests made using various additives of the invention are also given in Table 2.

TABLE 2

| Additive used | p.h.p. | Percent by weight of total formulation | 16 hrs. at 255° F. Contact | 16 hrs. at 255° F. Vapor | 7 days at 215° F. Contact | 7 days at 215° F. Vapor |
|---|---|---|---|---|---|---|
| None, standard | None | 0.0 | 3 | 4 | 3 | 2 |
| TMCB | 0.38 | 0.21 | | | 34 | 38 |
|  | 0.50 | 0.28 | 64 | 69 | | |
|  | 0.75 | 0.42 | | | 47 | 60 |
| n-Octyl bromide | 0.75 | 0.42 | | | 37 | 51 |
| Lauryl bromide | 1.50 | 0.84 | | | 32 | 41 |
| Dodecenyl chloride | 0.9 | 0.50 | | | 41 | 55 |
|  | 1.7 | 0.95 | | | 53 | 69 |
| Epibromohydrin | 0.65 | 0.36 | | | 41 | 46 |
|  | 1.3 | 0.73 | | | 37 | 62 |
| Tris-β-chlorethyl phosphate | 1.7 | 0.95 | | | 42 | 49 |

EXAMPLE IV

Several samples for related tests on the use and effect of adjuvant utilize vinyl skin prepared as described in Example I. The aminopolyol and non-aminopolyol formulations of Examples II and III are employed, differing in the further use of terpolymer along with the halogen-containing additive.

It was shown by test that the combination of the halogen-containing additive with the terpolymer adjuvant was readily effected; gave a product easily introduced into the polyurethane formulation; and dispersed readily, rapidly and uniformly during compounding of the polyurethane formulations. Further it was determined that the presence of the adjuvant along with the halogen-containing component in the additive combination reduced or eliminated any tendency during the compounding, cream and rise, foaming and cross-linking, and set of the foam of the halogen-containing component to have any adverse effect on foam processability, foam quality, or compression set. The inhibiting contribution of the halogen-containing component was at least as good in imparting anti-stain characteristics. The storage stability of the halogen-containing component in the adjuvant was shown by no deterioration of any of the desirable qualities after thirty days storage at room temperature or after storage at room temperature for two weeks followed by 4 days at 74° C.

The information on test results on various samples is presented in Table 3 below.

TABLE 3

|  | P.h.p. | | Seconds | | Compression [2] | Accelerated stain test [3] | |
|---|---|---|---|---|---|---|---|
|  | Halide [1] | Terpolymer | Cream time | Rise time |  | Contact | Vapor |
| Aminopolyol | | | | | | | |
| Control (standard Ex. II) | 0 | 0 | 10 | 240 | 11.0 | 6 | 12 |
|  | 0.5 | 0.5 | 12 | 230 | 10.9 | 53 | 64 |
| Non-aminopolyol | | | | | | | |
| Control (standard, Ex. III) | 0 | 0 | 18 | 140 | 4.1 | 3 | 4 |
|  | 0.5 | 0.12 | 13 | 118 |  | [4] 45 | [4] 49 |
|  | 0.5 | 0.5 | 15 | 135 | 4.4 | 64 | 67 |

[1] 1-bromo-3-chloropropane.
[2] Set at 50% deflection after 22 hrs. at 158° F.
[3] Percent reflectance after 16 hrs. at 255° F.
[4] Test temperature 265° F.

Other tests have shown the halide additives herein defined have a positive stain-inhibiting effect when employed in the polyurethane formulations in amounts as low as 0.1% by weight of the total formulation and as high as or higher than 4.0% by weight of the total formulation. However, the advantages of amounts above about 4% by weight are relatively slight and are usually offset by the presence of undesirable attributes of noticeable odor or other possible undesirable features. The beneficial aspects in the usage of the adjuvant have been found to be in the range of about 0.2 to 1.5 parts by weight per part by weight of the halide additives employed. Use of amounts less than about 0.2% has shown that the advantages tend to be obscured and that amounts in excess of 1.5% do not generally provide advantages proportional to such increased amount.

Such data are illustrative of the possibilities and advantages in improving the quality and acceptability of polyurethane semi-rigid foams having substantially reduced stain-imparting characteristics when associated in contact usage with polyvinyl skins.

Obviously, many modifications and variations of the invention as hereinbefore set forth may be made without departing from the spirit and scope thereof, and therefore only such limitations should be imposed as are indicated in the appended claims.

I claim:
1. A laminated plastic product comprising:
   (a) a layer of non-porous polyvinyl chloride plastic in coplanar juxtaposition with
   (b) a body of polyurethane foam, said foam containing at least a remnant of the tertiary amine catalyst used in the foam precursor, and an effective amount of a stain-inhibitor comprising at least one organic halide selected from the group consisting of alkyl bromide, aralkyl halide, alkyl dibromide, aralkyl dibromide, alkyl chloro-bromides, epihalohydrins, haloalkyl phosphate esters, and those organic halides having an allylic double bond structure, whereby the tendency of said foam to stain said polyvinyl chloride plastic is substantially inhibited.

2. The product of claim 1 wherein said organic halide is trimethylene chlorobromide.

3. The product of claim 1 wherein said organic halide is n-octyl bromide.

4. The product of claim 1 wherein said organic halide is lauryl bromide.

5. The product of claim 1 wherein the amount of said stain-inhibitor is in the range of from 0.1 to 4.0 weight percent of the total formulation weight of said polyurethane foam.

6. The product of claim 1 wherein said polyurethane foam includes a multifunctional terpolymer in an amount in the range of from 0.2 to 1.5 times the weight of said organic halide.

References Cited

UNITED STATES PATENTS

| 3,067,149 | 12/1962 | Dombrow et al. | 260—2.5AI |
| 3,067,150 | 12/1962 | Dombrow et al. | 260—2.5AI |
| 3,074,911 | 1/1963 | Harper | 260—45.85 |
| 3,446,694 | 5/1969 | Hoskinson et al. | 161—160 |
| 3,462,381 | 8/1969 | Eaton et al. | 260—2.5AI |

MORRIS SUSSMAN, Primary Examiner

U.S. Cl. X.R.

260—2.5, 77.5; 117—138.8